United States Patent
Muth

(10) Patent No.: US 7,377,005 B2
(45) Date of Patent: May 27, 2008

(54) VACUUM APPARATUS

(76) Inventor: Gordon E. Muth, R.R. #1, Box 1031, Sylvan Lake, Alberta T4S 1X6 (CA)

(*) Notice: Subject to any disclaimer, the term of this patent is extended or adjusted under 35 U.S.C. 154(b) by 736 days.

(21) Appl. No.: 10/809,813

(22) Filed: Mar. 26, 2004

(65) Prior Publication Data

US 2005/0125938 A1    Jun. 16, 2005

Related U.S. Application Data

(63) Continuation-in-part of application No. 10/301,855, filed on Nov. 22, 2002, now Pat. No. 6,976,287.

(51) Int. Cl.
*A47L 5/38* (2006.01)

(52) U.S. Cl. .................. 15/314; 15/340.1; 285/7; 285/236

(58) Field of Classification Search ............. None
See application file for complete search history.

(56) References Cited

U.S. PATENT DOCUMENTS

| | | | |
|---|---|---|---|
| 4,391,017 A * | 7/1983 | Bruensicke | 15/313 |
| 4,540,202 A * | 9/1985 | Amphoux et al. | 285/184 |
| 5,048,875 A | 9/1991 | Usui et al. | |
| 5,632,513 A | 5/1997 | Cassel | |
| 6,234,543 B1 | 5/2001 | Logan et al. | |
| 6,976,287 B2 * | 12/2005 | Muth | 15/340.1 |

FOREIGN PATENT DOCUMENTS

CA      2307055      10/2001

* cited by examiner

*Primary Examiner*—David A Redding
(74) *Attorney, Agent, or Firm*—Adrian D. Battison; Michael R. Williams; Ryan W. Dupuis

(57) ABSTRACT

A vacuum hose for moving particulate materials such as grain from a storage bin is formed from separate pieces of metal tube and flexible rubber hose arranged alternately and connected end to end by hose clamps. The pieces are at least 12 inches long and less than 36 inches long to provide relatively short lengths connected end to end. A cart is provided for moving the nozzle and hose end and has a frame mounted on two pairs of ground wheels. The pipe of the nozzle extends along a center of the cart with a foot pad on each side for the operator to ride and a nozzle of the pipe projecting from the front of the cart. The cart is driven by a pair of motors extending across the cart each driving a respective pair of wheels the motors being mounted underneath the pipe with one in front of the other. A manually operable control in the form of an upstanding support bar is carried on front of the frame and operable by the operator with two switches operable to control the motors separately for forward and rearward movement of the cart and steering movements of the cart to each side for guiding the cart and the nozzle over the surface.

14 Claims, 3 Drawing Sheets

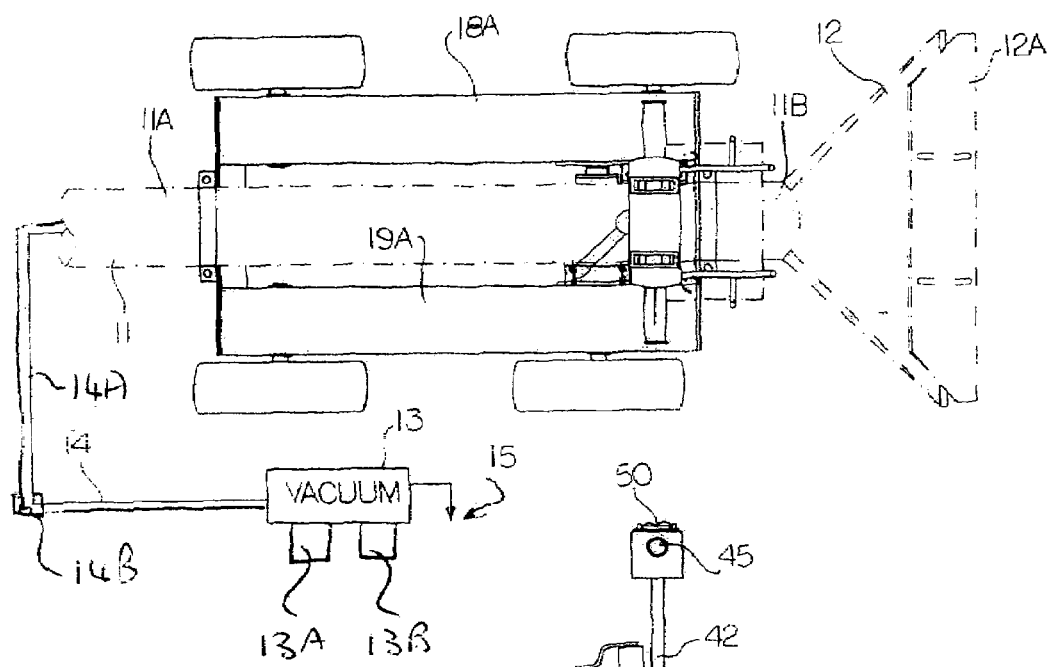
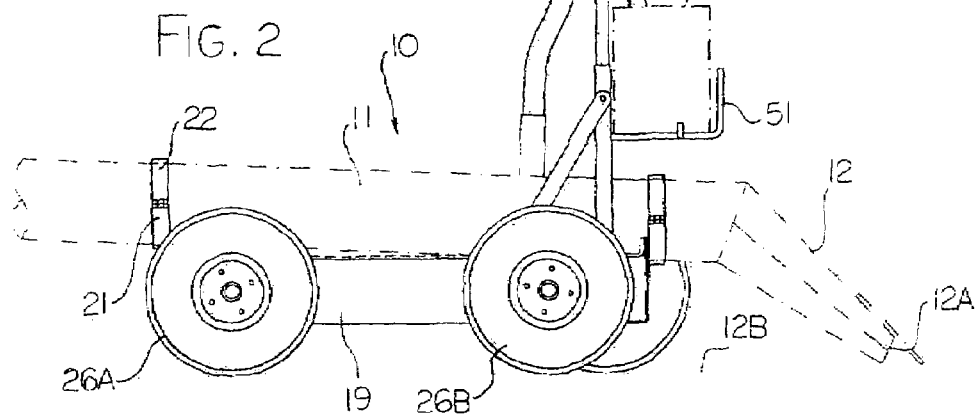

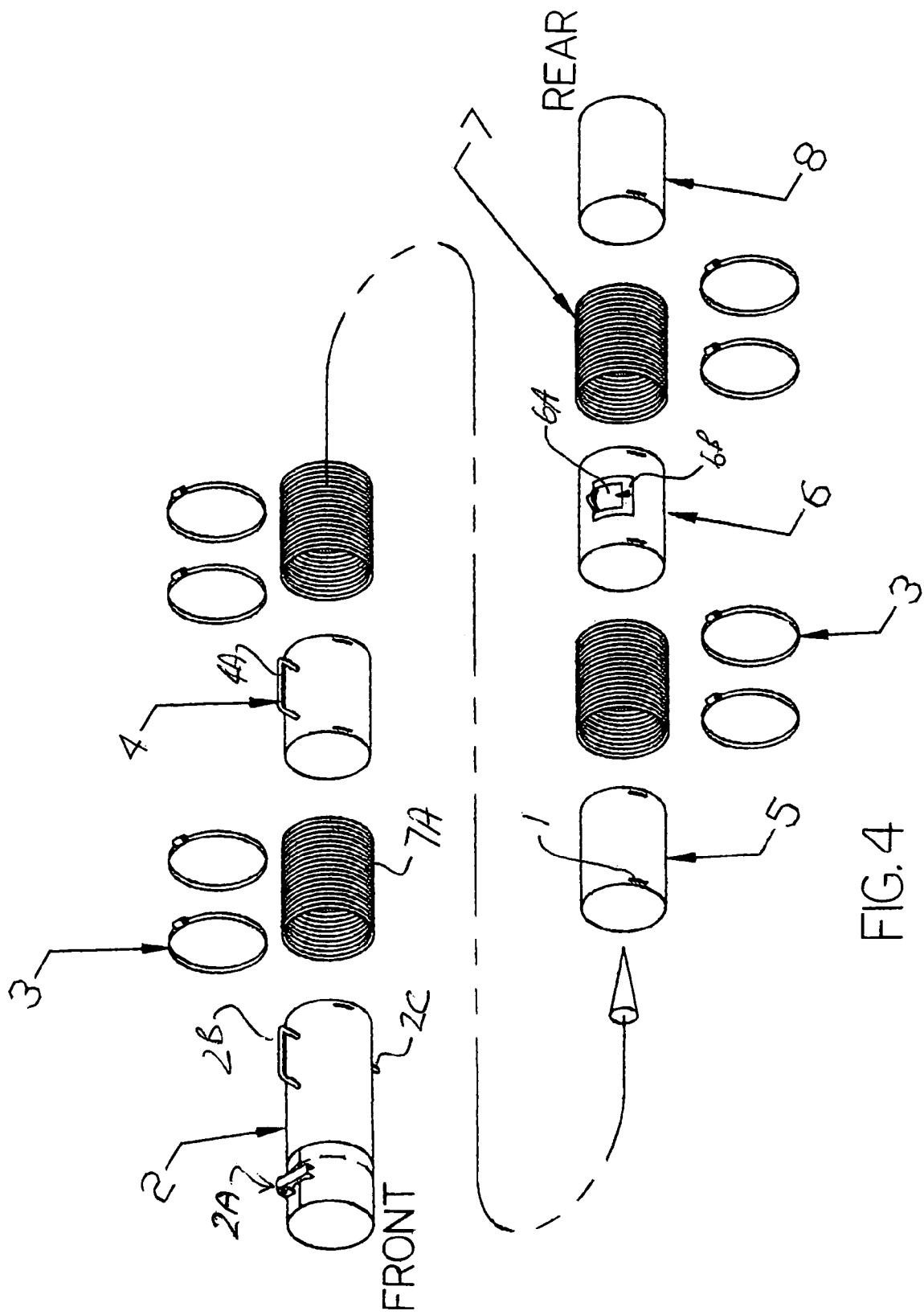

VACUUM APPARATUS

This application is a continuation-in-part application from application Ser. No. 10/301,855 filed Nov. 22, 2002 now U.S. Pat No. 6,976,287.

FIELD OF THE INVENTION

The present invention relates to an apparatus for moving particulate material including a vacuum soured and a hose and nozzle assembly therefor.

BACKGROUND OF THE INVENTION

Vacuums are used for removing grain and other materials from a storage bin. Such vacuums necessarily include a large and heavy pipe and nozzle which must be moved over the floor of the storage bin from place to place to pick up the material to be removed.

Such vacuum hoses for transporting grain materials are necessarily relatively large diameter and therefore are relatively heavy. They must however be flexible sufficiently to allow the user to move the nozzle at the forward end of the hose to the required locations within the bin with the vacuum source located outside the bin.

Conventionally such vacuum hoses have been formed from flexible rubber or similar polymeric materials which have sufficient strength to avoid collapse under the interior vacuum and yet allow the required flexibility to curve the hose around a curvature sufficiently small to allow the nozzle to reach any location within the bin which is required. Such hoses are conventionally formed from transversely or circumferentially corrugated materials which provide the necessary hoop strength and yet allow flexing in the folding action of the corrugations in the manner of an accordion fold.

The flexible hose is connected at its forward end to a nozzle structure generally using a hose clamp for clamping the open end of the flexible hose portion around the outside of an end collar or just an end piece of the cylindrical nozzle section. Similarly the rear end of the hose is connected to an inlet duct at the vacuum source.

Various connections are known for coupling such flexible hoses and some connections are shown in U.S. Pat. No. 5,048,875 (Usui et al), issued Sep. 17th, 1991; U.S. Pat. No. 5,632,513 (Cassel), issued May 27th, 1997; U.S. Pat. No. 6,234,543 (Logan et al), issued May 22nd, 2001.

However these arrangements simply provide a connection between the conventional elongate section of flexible hose and a metal section.

One problem that arise with the hoses of this type is that the flow rate can be relatively low and it is necessary in all cases to obtain the maximum flow so as to increase the rate at which the material is extracted from the storage location to minimize the amount of time required.

In addition hoses of this type wear rapidly due to the dragging of the hose from place to place so the replacement of the lengthy hose section is often necessary with relatively high cost.

SUMMARY OF THE INVENTION

It is one object of the present invention to provide an apparatus for moving particulate material from a storage location using a flexible hose.

According to the present invention there is provided an apparatus for transporting particulate material comprising:

a vacuum system including an air pump having a vacuum side and an outlet side, an inlet opening for receiving an inlet stream of air generated by the vacuum side of the pump and containing the particulate material to be transported, a separation system for separating the particulate material from the inlet air stream for passage of the air stream through the pump and an outlet duct for receiving the air stream from the outlet side of the pump and for transporting the particulate material from the separation system to an outlet location;

an inlet nozzle assembly movable at an inlet location for collecting the particulate materials to be transported from the inlet location by the inlet air stream;

and a flexible hose connected between the inlet nozzle assembly and the inlet opening of the vacuum system and arranged to provide sufficient flexibility to allow movement of the inlet nozzle assembly to required locations at the inlet location;

the flexible hose having at least three tubular rigid metal portions and at least three tubular flexible polymeric portions with the rigid portions and the flexible portions being connected end to end in a row alternately so that each rigid portion is connected at its ends to respective ones of two flexible portions and each flexible portion is connected at its ends to respective ones of two rigid portions.

The term polymeric material used herein is intended to include both rubber and other natural polymer materials together with synthetic materials.

Preferably each flexible portion is connected at its end to a rigid portion by a hose clamp which clamps an end surrounding piece of the flexible portion onto the end of the rigid portion.

Preferably the hose is formed substantially wholly along its length from the nozzle assembly to the inlet opening by alternating flexible pieces and rigid pieces.

Preferably all the rigid pieces are of substantially equal length.

Preferably both the rigid pieces and the flexible pieces are substantially of equal length.

Preferably each rigid and each flexible piece is at least 12 inches in length.

Preferably no rigid nor flexible piece has a length greater than 3 feet.

Preferably the hose includes two manually grasp able handles with one on each of the first two rigid pieces.

Preferably the hose includes air flow control opening on one of the rigid pieces located adjacent to the inlet opening.

Preferably the hose and a mouth of the hose are cylindrical and wherein the nozzle assembly forms a slot.

Preferably each of the flexible pieces is formed from a length of a transversely corrugated hose.

Preferably there is provided a transport cart for moving the nozzle and the pipe relative to the vacuum source across a surface from which the material is to be removed by the nozzle while the vacuum source remains at a fixed location; the cart including: a frame; ground wheels for supporting the frame for movement across the surface; a motor for driving one or more of the ground wheels; a support on the frame for receiving an operator supported on the frame for movement therewith; and a manually operable control arrangement carried on the frame and operable by the operator while the operator is carried on the frame, the control arrangement being operable to control forward and rearward movement of the cart and steering movements of the cart to each side for guiding the cart and the nozzle over the surface.

Preferably the cart has four wheels each of which is driven.

Preferably the cart has two wheels on each side where the wheels on one side are commonly driven by a first motor and the wheels on the other side are commonly driven by a second motor such that steering movement of the cart is controlled by differential forward and rearward driving movement of the wheels on the two sides.

Preferably the manually operable control arrangement comprises a pair of switches each for controlling forward and reverse movement of a respective one of the first and second motors.

Preferably the support for the operator comprises a pair of foot pads each for receiving the operator standing on the cart.

Preferably the manually operable control arrangement comprises an upstanding handle bar at a front of the cart for grasping by the standing operator.

Preferably the frame defines a channel for the pipe longitudinally of the frame such that a rear end of the pipe is located at a rear end of the frame and the nozzle is carried at a forward end of the pipe in front of the frame.

Preferably the frame defines a pair of foot pads each on a respective side of the pipe on which the operator can stand.

Preferably the frame carries a pair of motors each defining an axis of a drive shaft extending across the frame underneath the channel for the pipe.

Preferably each motor drives a sprocket and chain for driving one of the wheels spaced along the frame from the motor, the frame having a channel on each side of the pipe channel for receiving the chain.

Preferably the motors are electric.

Preferably the pipe extends along the cart from a rear end at a rear of the cart to the nozzle at the front end and wherein the motors are arranged underneath the pipe one in advance of the other.

According to a second aspect of the invention there is provided an apparatus for transporting particulate material comprising:

a vacuum system including an air pump having a vacuum side and an outlet side, an inlet opening for receiving an inlet stream of air generated by the vacuum side of the pump and containing the particulate material to be transported, a separation system for separating the particulate material from the inlet air stream for passage of the air stream through the pump and an outlet duct for receiving the air stream from the outlet side of the pump and for transporting the particulate material from the separation system to an outlet location;

an inlet nozzle assembly movable at an inlet location for collecting the particulate materials to be transported from the inlet location by the inlet air stream;

a first hose piece connected to the inlet opening;

a second hose piece formed at least partly of flexible material connected between the inlet nozzle assembly and the inlet opening of the vacuum system and arranged to provide sufficient flexibility to allow movement of the inlet nozzle assembly to required locations at the inlet location;

wherein the hose includes air flow control opening on second hose piece located at a position therealong adjacent to the first hose piece for controlling entry into the first hose piece of additional exterior air.

According to a third aspect of the invention there is provided a method of transporting particulate material from a storage bin comprising:

providing a vacuum system including an air pump having a vacuum side and an outlet side, an inlet opening for receiving an inlet stream of air generated by the vacuum side of the pump and containing the particulate material to be transported, a separation system for separating the particulate material from the inlet air stream for passage of the air stream through the pump and an outlet duct for receiving the air stream from the outlet side of the pump and for transporting the particulate material from the separation system to an outlet location;

moving an inlet nozzle assembly within the storage bin for collecting the particulate materials by the inlet air stream;

and providing a flexible hose connected between the inlet nozzle assembly and the inlet opening of the vacuum system and arranged to provide sufficient flexibility to allow the movement of the inlet nozzle assembly to required locations within the bin;

the flexible hose being provided with sufficient flexibility by being formed by at least three tubular rigid metal portions and at least three tubular flexible polymeric portions with the rigid portions and the flexible portions being connected end to end in a row alternately so that each rigid portion is connected at its ends to respective ones of two flexible portions and each flexible portion is connected at its ends to respective ones of two rigid portions.

BRIEF DESCRIPTION OF THE DRAWINGS

In the accompanying drawings, which illustrate an exemplary embodiment of the present invention:

FIG. 1 is a top plan view of one embodiment of the apparatus according to the present invention.

FIG. 2 is a side elevational view of the apparatus of FIG. 1.

FIG. 4 is an exploded view of the hose of FIG. 1.

DETAILED DESCRIPTION

Figure 3:
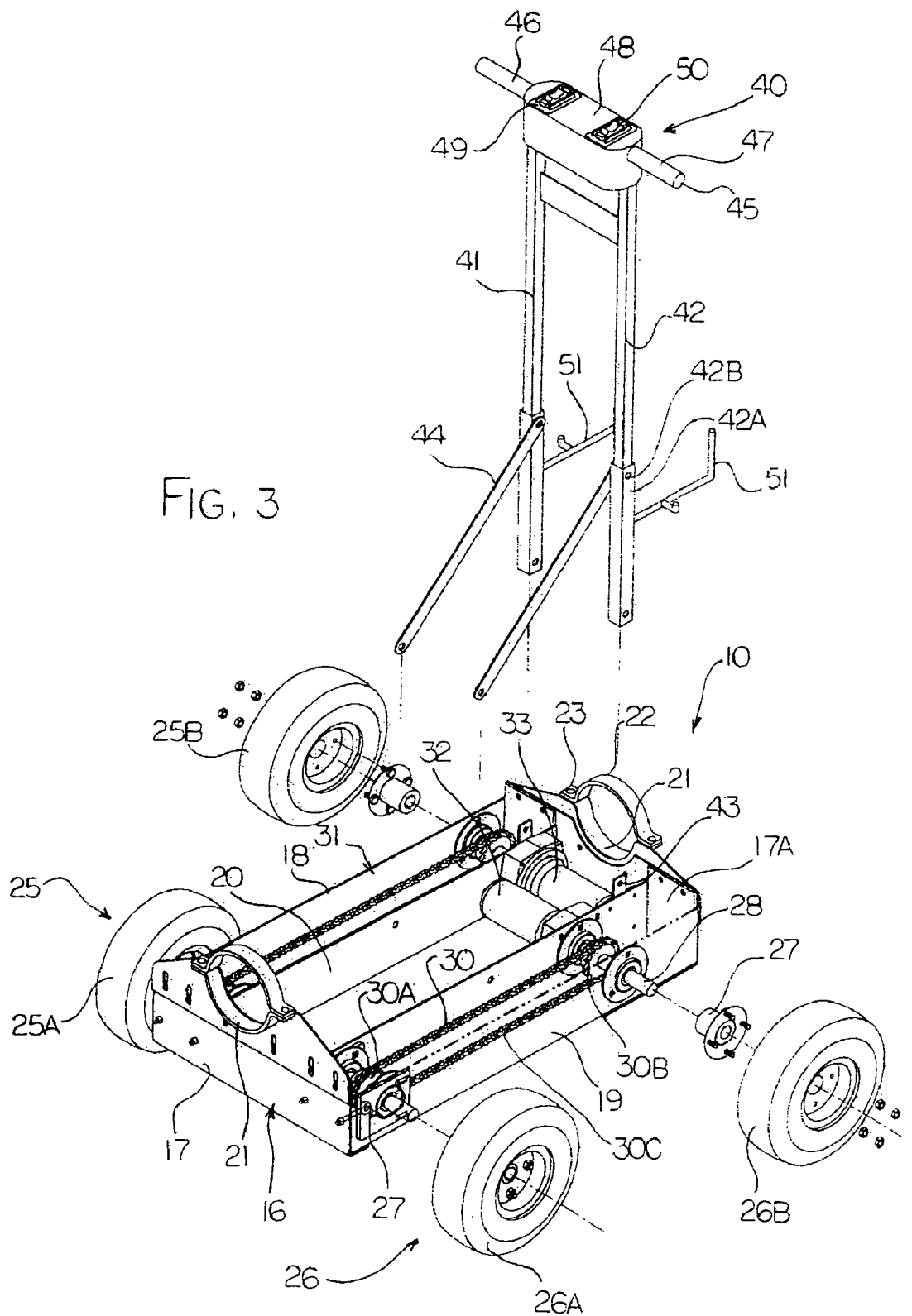
FIG. 3 is an exploded view of the apparatus of FIG. 1.

The apparatus shown in the figures comprises a cart generally indicated at 10 which carries a vacuum pipe 11 and a nozzle 12 in movement of the nozzle over the ground for vacuuming up material on the ground.

The device is primarily designed for use with a conventional grain vacuum generally indicated at 13 and shown only schematically since this is well known to one skilled in the art. which has an inlet hose 14, 14A for transporting particulate material, primarily grain, from a storage bin to a discharge schematically indicated at 15. Such grain vacuums are well known and available from a number of different manufacturers and include a vacuum pump 13A and a separator 13B which extracts the particulate material or grain from the air stream for discharge into a container such as a transportation truck at the discharge 15. The hose includes a first hose piece 14 which is formed of steel sections of a slightly flexible construction so as to provide sufficient strength with minimal flexibility merely for location of a coupling 14B at a suitable location. The hose includes a second hose piece 14A extending from the coupling 14B which is sufficiently flexible to provide the required flexing to allow full movement of the nozzle.

The cart comprises a frame 16 defined by two end plates 17 and 18 connected by longitudinal channels 18 and 19 each at a respective side of the end plates. Between the two channels 18 an 19 is defined an area 20 which receives the pipe 11 so that the pipe is carried longitudinally of the channels and longitudinally of the frame with a rear end 11A of the pipe exposed at the rear end of the frame and a forward end 11B of the pipe exposed at the front of the frame. The pipe is held in place within a semicircular receptacle surface 21 of each of the end plates 17 and 17A by a respective strap 22 which is clamped down onto the end plate by screws 23. Thus the cylindrical pipe is held at its ends at the end plates and extends along the frame within the open channel 20 between the two channel member 18 and 19.

The pipe and nozzle are preferably formed as a part of the cart which is sold to an end user for attachment to the end of the hose of an existing vacuum machine. Thus the cart, if manufactured to include the pipe and nozzle, forms in effect a movable vacuum head which carries the nozzle across the ground. However the cart may also be manufactured without the pipe and nozzle for attachment to an existing pipe and nozzle of an existing vacuum machine. In that case the existing pipe is laid along the central channel 20 and clamped into place.

The frame 16 is mounted on two pairs of ground wheels including a first pair 25 including ground wheels 25A and 25B on one side and the second pair 26 including ground wheels 26A and 26B on the opposite side. The ground wheels are carried on bearings 27 attached to the outside wall of the respective channel 18, 19. Each of the ground wheels is mounted on a respective shaft 28 for driven rotation for causing movement of the frame across the ground. Thus the shaft 28 of the ground wheel 26B is connected to the shaft 28 of the ground wheel 26A by a drive system 30 including a pair of sprockets 30A and 30B and a chain 30C. Thus the pair of ground wheels 26 are both driven at a common speed by the drive system 30 and symmetrically the pair of wheels 25 are also driven by a second drive system 31 arranged symmetrically on the opposite side. The drive system 30 is driven by a motor 32 and the drive system 31 is driven by a motor 33. The motors are mounted across a channel 20 underneath the pipe 11 and suitably supported at the ends of the motor on the inside walls of the channels 18 and 19. Thus the motor 33 is in advance of the motor 32 and arranged in a common horizontal plane with the motor 32 at the front of the frame. The motor 32 includes a drive shaft connected to or common with the drive shaft 28 of the ground wheel 26B. Symmetrically the motor 33 of the drive shaft connected to the wheel 25B and thus as best shown in the top plan view of FIG. 1 the wheel 25B is forward of the wheel 26B.

The channel member 18 an 19 are covered by a foot pad 18A and 19A respectively. Each foot pad has a length equal to the length of the cart and a width sufficient to received the booted foot of an operator so that the foot can be located on the foot pad outside of the pipe 11 and within the ground wheels so as to avoid interfering with the movement of the ground wheels. The foot pads are preferably formed of a slip-resistant metal sheet allowing the operator to readily step into place over the ground wheels and onto the foot pad on either side of the pipe.

On the front of the frame is provided an upstanding handle bar arrangement allowing the operator to hold the handle bar while standing on the foot pads. The handle bar 40 is carried on a pair of upstanding posts 41 and 42 connected at their lower ends to a respective attachment lug 43 at the inside of the respective channel member. The post are braced by downwardly and rearwardly inclined braces 44 which are also connected at their lower ends to a suitable location on the inside of the respective channel member. The height of the posts 41 and 42 can be adjusted by sliding tube-in-tube arrangement as indicated at 42A and locked in place by a pin 42B. At the top of the post is provided a cross bar 45 defining handles 46 and 47 which can be grasped by the hands of the operator while standing on the foot pads. Thus the operator remains stable in place standing on the cart when the cart is moved by operation of the motors. The handle bars include a control unit 48 having a pair of rocker switches 49 and 50 located for operation by the thumb of a respective hand of the operator while the hand remains grasping the respective handle. The rocker switch is of the type defining three positions including a central stop position, a forward tilt position and a rearward tilt position but the rocker switch is being biased to the central stop position. The motors are powered by a battery 70 conveniently carried on a pair of brackets 51 attached to the posts 41 and 42 so as to project forwardly away from the feet of the operator.

The nozzle 12 is attached to the forward end of the pipe 11 so that it extends downwardly and forwardly to a nozzle slot 12A which is located at a height relative to the ground wheels so that the nozzle slot is moved over the ground surface 12B in a vacuuming action.

The switches 49 and 50 are operated by the thumb of the operator either forwardly or rearwardly to effect forward or rearward driving motion of the respective motors and therefore the respective wheels.

The cart is therefore driven by all four wheels and can be driven forwardly by all four wheels to push the nozzle into the material to be lifted. The cart can be moved rearwardly by all four wheels by operating the switches 49 and 50 to the rearward position. The cart can be steered by differential operation of the motors. Steering around a vertical central axis is effected by driving one set of wheels forwardly while the other set drives rearwardly. Thus the cart can be moved readily across the surface 12B to vacuum up all the material within the storage bin.

In general it is necessary to move the cart only periodically since the vacuum action is necessary at a fixed location for a period of time to remove the material at that point. Thus the operator can simply stand in place until the material has been removed sufficiently to allow the cart to be moved forwardly to take up more material. The nozzle 12 has a slot width substantially equal to the width of the cart so that forward movement of the cart into the material vacuums a swath of the material allowing the cart to enter the swath or swept space in the forward moving action. The cart can then be reversed and moved into a second area to vacuum a further swath of the material.

Optionally a valve 60 can be provided at the posts 41 and 42 close to the handle bar so that the valve 60 can be operated by the operator to control the air flow. The air lock valve can operate either the vacuum machine itself or a butterfly or gate-type valve within the pipe 11.

In order for the cart to be readily inserted into a bin, where often access is difficult, the cart can be readily disassembled or folded so that it can be manually lifted into the bin. Thus the pipe is readily disconnectable from the vacuum hose by a conventional clamp locking arrangement commonly used on the suction hose of vacuum devices of this type. Thus the pipe and nozzle arrangement is readily removable from the cart by simply pulling a pin releasing the pipe and nozzle from its mounting on the cart. Thus the bracket 21 may comprise a pinned connection which can be readily released which directly holds the pipe in place against forward and rearward sliding movement in response to pulling or pushing forces on the pipe or nozzle.

In addition the posts 42 and the control system carried thereby can be folded downwardly about a pivot pin at the bottom of the posts allowing the post to fold down in position flat onto the frame between the wheels. Thus the highest point of the structure is the wheels themselves allowing the cart when folded to be inserted readily into a small opening into the bin. The brackets 51 can also be folded downwardly onto the posts or can be readily removed. The battery itself is held in place by a quick connection both electrically and physically so that it can be removed as a separate item for separate transport into the bin, bearing in mind that the battery is relatively heavy.

The cart is formed from aluminium or other suitable lightweight materials allowing it to be readily lifted by the user.

Thus when disassembled, the cart itself can be inserted into the bin, the separate pipe and nozzle inserted into the bin and the battery also carried in the bin for re-assembly within the bin for operation.

While in some cases a fixed nozzle can be suitable, it is also desirable in some cases to provide a floating action of the ground engaging portion of the nozzle and also a height adjustment for the pipe which raises and lowers the nozzle to accommodate uneven ground contours. Thus in an additional embodiment, the nozzle is formed by a horizontal plate forming a top surface of an nozzle with a floating skirt connected to the outside edges of the plate at the sides and rear leaving a front edge open as a slot for drawing in the material to be transported. The skirt is carried on the side edges of the horizontal plate in manner which allows the skirt to float upwardly and downwardly in response to engagement at the bottom edge of the skirt with the ground. Suitable plastics material can be used as the skirt for wear resistance and readily replacement when worn.

In addition where the floating action of the skirt is insufficient to accommodate ground height changes, the height of the forward end of the pipe can be raised and lowered by a lift control mounted at the hand controller 50 on the posts. Thus a simple lever and cable connection can be provided from the top of the mast to the forward end of the pipe at the bottom of the mast allowing the forward end to be raised and lowered relative to a pivot at the rear bracket 21. Thus the user if necessary can raise the pipe thus raising the nozzle either for accommodating changes in ground height for engaging onto the top of a pile of material to be removed.

In FIG. 4 is shown a particular construction of the hose which has been found to be particularly advantageous for use with the arrangement described above. The hose can also be used in a conventional manual system in which the hose is simply lifted from place to place by the handles provided on the hose adjacent the forward end.

The hose as shown in FIG. 4 comprises tubular metal sections 2, 4, 5, 6 and 8 each of which is a rigid section formed from tubular metal generally steel having a diameter matching the diameter of the hose structure. The rear section 8 can be clamped to the inlet pipe of the vacuum source or may itself comprise the inlet of the vacuum source. In many cases the inlet pipe of the vacuum source is a flexible steel pipe section which is connected to the piece 8 by a clamp on the hose (not shown). In addition to the tubular metal sections 2, 4, 5, 6 and 8, there are four intervening flexible hose sections 7 each of which is formed from a length of rubber tubular hose which is cut to the required length. The tubular rubber hose is of the transversely corrugated type to define corrugations or flexible folds which allow the side to side flexing of the flexible section. The material may be rubber or may be some other polymer wither natural or synthetic. The flexible sections may be reinforced by reinforcing bands or fibres or may be simply formed from moulded rubber or similar material.

The flexible sections and the metal rigid sections are arranged alternately so that they are connected end to end with each flexible section being connected at its ends to a respective one of the metal sections.

The connection is formed by a conventional hose clamp 3 which clamps and end piece of the flexible rubber hose section to the end of the respective metal section. A rib or raised piece 1 can be provided at each end of each metal section to better clamp onto the end of the flexible piece.

The flexible pieces and the metal pieces generally have a length greater than 12 inches and preferably less than 24 inches. A length of approximately eighteen inches is in many cases suitable since this provides the necessary flexibility of the structure while forming the majority of or at least have the length of the hose with rigid metal pieces. It has been surprisingly found that formation of the hose in this manner allows sufficient flexibility and yet allows approximately one half of the hose to be formed from the rigid metal pieces. The rigid metal pieces provide both a smoother interior surface to allow the transportation of the particulate material and also provide a conductive surface so that there is a reduced build-up of static on the particulate material as it is transported. It may be even that the static that is built up on the particulate material as it passes over the rubber flexible pieces is discharged in the metal sections. However in any event the fact that at least half of the structure is formed from the metal avoids the high build-up of static which normally occurs in-between the flexible rubber hose and the particulate material which has been found to dramatically reduce flow rates within conventional hoses.

It will be noted that the section 2 at the forward end of the hose includes a clamp to A which can clamp onto a metal collar at the rear end of the nozzle assembly as shown in FIGS. 1 and 2. The clamp 2A provides a quick release connection so that the hose can be rapidly disconnected from the nozzle assembly which is either of the cart type shown or can be of a manual nozzle so the hose can be disconnected for extraction from the storage bin.

The front section 2 also includes a handle to be in the form of a conventional loop attached onto the outside of the tubular section 2 for manual movement of the hose at the forward end. A stand 2C can be provided on the underside of the front piece 2 so that the hose can remain upright on the stand 2C with the handle 2B at the top. The next section 4 after the first flexible section 7A also includes a handle 4A matching the handle 2B so that the forward end on either side of the first flexible section 7A can be grasped by the two hands of the operator lifting the forward end and manoeuvring it to a required location.

The piece 6 which is adjacent to the inlet to the vacuum either as the last piece or the penultimate piece includes an adjustable opening 6A which can be operated by a thumbscrew to increase or decrease and area of opening in a panel 6B attached onto the piece. Thus additional air can be allowed to flow into the hose at the location on the piece 6 to increase air flow and thus increase air velocity to assist in carrying the particulate materials, in the event that the airflow becomes restricted and reduces in velocity due to limited air flow through the nozzle or restrictions by the collection of materials within the hose.

The four flexible pieces formed in the hose surprisingly provide sufficient flexibility to allow the hose to operate in the conventional manner.

The number of flexible pieces and the number of metal pieces can be increased or decreased as required depending upon the intended complete length of the hose. In practice a hose from a grain vacuum is formed with an initial metal piece formed of a slightly flexible steel construction material allowing it to define a major part of the whole hose length and to be moved to an initial location within a storage location. The remaining length of the hose is intended to be wholly flexible and thus is generally formed of rubber as described in the prior art. Such a piece may be of a length of the order of nine feet. In order to duplicate this conventional hose piece, such a hose when constructed using the arrangement described herein can utilize between three and six and preferably four flexible pieces and between three and six preferably five rigid steel pieces. Preferably the flexible pieces and the metal pieces have approximately the same length which can preferably be in the range 12 to 24 inches. This has been found to provide an effective flow rate while allowing sufficient flexibility. In practice the rubber pieces are preferably 16 inches long and the steel pieces 12 inches long.

The further advantage of the structure is that a repair to a worn hose piece can be readily effected by inserting a cut hose piece of the required length in replacement for one of the hose pieces which is simply removed by releasing the clamps 3. Thus an inexpensive repair can be effected simply by replacing only one of the relatively short pieces at relatively low cost.

While one embodiment of the present invention has been described in the foregoing, it is to be understood that other embodiments are possible within the scope of the invention. The invention is to be considered limited solely by the scope of the appended claims.

The invention claimed is:

1. Apparatus for transporting particulate material comprising:
    a vacuum system including an air pump having a vacuum side and an outlet side, an inlet opening for receiving an inlet stream of air generated by the vacuum side of the pump and containing the particulate material to be transported, a separation system for separating the particulate material from the inlet air stream for passage of the air stream through the pump and an outlet duct for receiving the air stream from the outlet side of the pump and for transporting the particulate material from the separation system to an outlet location;
    an inlet nozzle assembly movable at an inlet location for collecting the particulate materials to be transported from the inlet location by the inlet air stream;
    and a flexible hose connected between the inlet nozzle assembly and the inlet opening of the vacuum system and arranged to provide sufficient flexibility to allow movement of the inlet nozzle assembly to required locations at the inlet location;
    the flexible hose being arranged to provide flexibility to allow free movement of the inlet nozzle assembly to required locations at the bulk supply of the crop materials;
    the flexible hose having at least three tubular rigid metal portions and at least two tubular flexible polymeric portions with the rigid portions and the flexible portions being connected end to end in a row alternately.

2. The apparatus according to claim 1 wherein each flexible portion is connected at its end to a rigid portion by a hose clamp which clamps an end surrounding piece of the flexible portion onto the end of the rigid portion.

3. The apparatus according to claim 1 wherein the hose is formed substantially wholly along its length from the nozzle assembly to the inlet opening by alternating flexible pieces and rigid pieces.

4. The apparatus according to claim 1 wherein all the rigid pieces are of substantially equal length.

5. The apparatus according to claim 1 wherein both the rigid pieces and the flexible pieces are substantially of equal length.

6. The apparatus according to claim 1 wherein each rigid and each flexible piece is at least 12 inches in length.

7. The apparatus according to claim 1 wherein no rigid nor flexible piece has a length greater than 24 inches.

8. The apparatus according to claim 1 wherein the hose includes two manually grasp able handles with one on each of the first two rigid pieces.

9. The apparatus according to claim 1 wherein the hose includes air flow control opening on one of the rigid pieces located adjacent to the inlet opening.

10. The apparatus according to claim 1 wherein the hose and a mouth of the hose are cylindrical and wherein the nozzle assembly forms a slot.

11. The apparatus according to claim 1 wherein each of the flexible pieces is formed from a length of a transversely corrugated hose.

12. Apparatus for transporting particulate material comprising:
    a vacuum system including an air pump having a vacuum side and an outlet side, an inlet opening for receiving an inlet stream of air generated by the vacuum side of the pump and containing the particulate material to be transported, a separation system for separating the particulate material from the inlet air stream for passage of the air stream through the pump and an outlet duct for receiving the air stream from the outlet side of the pump and for transporting the particulate material from the separation system to an outlet location;
    an inlet nozzle assembly movable at an inlet location for collecting the particulate materials to be transported from the inlet location by the inlet air stream;
    and a flexible hose;
    the flexible hose having a first rigid tubular metal portion connected at a forward end to the inlet nozzle assembly;
    the flexible hose having a second rigid tubular metal portion releasably connected at a rearward end to the inlet opening;
    the flexible hose being arranged to provide flexibility to allow free movement of the inlet nozzle assembly to required locations at the bulk supply of the crop materials;
    the flexible hose having at least one tubular rigid metal intermediate portions and at least two tubular flexible polymeric portions with the rigid portions and the flexible portions being connected end to end in a row alternately;
    and an air inlet opening provided on one of the tubular rigid metal portions spaced from the first tubular rigid metal portion such that the air inlet opening is separated from the first tubular rigid metal portion by at least one of the tubular flexible polymeric portions.

13. Apparatus for transporting particulate material comprising:
    a vacuum system including an air pump having a vacuum side and an outlet side, an inlet opening for receiving an inlet stream of air generated by the vacuum side of the pump and containing the particulate material to be transported, a separation system for separating the particulate material from the inlet air stream for passage of the air stream through the pump and an outlet duct for receiving the air stream from the outlet side of the pump and for transporting the particulate material from the separation system to an outlet location;

an inlet nozzle assembly movable at an inlet location for collecting the particulate materials to be transported from the inlet location by the inlet air stream;

and a flexible hose;

the flexible hose having a first rigid tubular metal portion connected at a forward end to the inlet nozzle assembly;

the flexible hose having a second rigid tubular metal portion releasably connected at a rearward end to the inlet opening;

the flexible hose being arranged to provide flexibility to allow free movement of the inlet nozzle assembly to required locations at the bulk supply of the crop materials;

the flexible hose having at least two tubular rigid metal intermediate portions and at least three tubular flexible polymeric portions with the rigid portions and the flexible portions being connected end to end in a row alternately.

14. Apparatus for transporting particulate material comprising:

a vacuum system including an air pump having a vacuum side and an outlet side, an inlet opening for receiving an inlet stream of air generated by the vacuum side of the pump and containing the particulate material to be transported, a separation system for separating the particulate material from the inlet air stream for passage of the air stream through the pump and an outlet duct for receiving the air stream from the outlet side of the pump and for transporting the particulate material from the separation system to an outlet location;

an inlet nozzle assembly movable at an inlet location for collecting the particulate materials to be transported from the inlet location by the inlet air stream;

and a flexible hose;

the flexible hose having a first rigid tubular metal portion connected at a forward end to the inlet nozzle assembly;

the flexible hose having a second rigid tubular metal portion releasably connected at a rearward end to the inlet opening;

the flexible hose being arranged to provide flexibility to allow free movement of the inlet nozzle assembly to required locations at the bulk supply of the crop materials;

the flexible hose having at least one tubular rigid metal intermediate portion and at least two tubular flexible polymeric portions with the rigid portions and the flexible portions being connected end to end in a row alternately;

a first air inlet opening provided on the first tubular rigid metal portion which opening is separate from the nozzle;

and a second air inlet opening provided on one of the tubular rigid metal portions spaced from the first tubular rigid metal portion such that the second air inlet opening is separated from the first tubular rigid metal portion by at least one of the tubular flexible polymeric portions.

* * * * *